United States Patent
Park et al.

(10) Patent No.: US 9,311,689 B2
(45) Date of Patent: Apr. 12, 2016

(54) APPARATUS AND METHOD FOR REGISTRATION OF SURFACE MODELS

(71) Applicant: Electronics and Telecommunications Research Institute, Daejeon (KR)

(72) Inventors: Seong-Jin Park, Daejeon (KR); Bon-Ki Koo, Daejeon (KR); Jin-Sung Choi, Daejeon (KR); Do-Hyung Kim, Chungcheongbuk-do (KR); Il-Kyu Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 106 days.

(21) Appl. No.: 14/317,238

(22) Filed: Jun. 27, 2014

(65) Prior Publication Data
US 2015/0187061 A1 Jul. 2, 2015

(30) Foreign Application Priority Data
Dec. 27, 2013 (KR) .......................... 10-2013-0165865

(51) Int. Cl.
G06K 9/00 (2006.01)
G06T 3/00 (2006.01)
G06T 7/00 (2006.01)

(52) U.S. Cl.
CPC ............. *G06T 3/0068* (2013.01); *G06T 7/0032* (2013.01); *G06T 2207/10028* (2013.01); *G06T 2207/20212* (2013.01); *G06T 2207/30036* (2013.01)

(58) Field of Classification Search
None
See application file for complete search history.

(56) References Cited

U.S. PATENT DOCUMENTS

| | | | | | |
|---|---|---|---|---|---|
| 7,027,642 | B2 * | 4/2006 | Rubbert | ................... | A61C 7/00 345/419 |
| 7,068,825 | B2 * | 6/2006 | Rubbert | ................... | A61C 7/00 345/419 |
| 7,471,821 | B2 * | 12/2008 | Rubbert | ............... | A61B 5/1178 382/128 |
| 8,086,427 | B2 * | 12/2011 | Fang | ................... | H04R 25/652 345/419 |

(Continued)

OTHER PUBLICATIONS

"Recognition of Free-Form Objects in Complex Scenes Using DGI-BS Models," Pilar Merchan, et al, Proceedings of the Third International Symposium on 3D Data Processing, Visualization, and Transmission (3DPVT'06), 2006, 8 pages.*

(Continued)

*Primary Examiner* — Wenpeng Chen (57) ABSTRACT

An apparatus includes: an input/output interface configured to have a reference surface model and a floating surface model inputted thereto; a memory having instructions for registration of the reference surface model and the floating surface model stored therein; and a processor configured for registration of the reference surface model and the floating surface model according to the instructions. The instructions perform: selecting initial transformation parameters corresponding to the floating surface model by comparing depth images of the reference surface model and the floating surface model; transforming the floating surface model according to the initial transformation parameters; calculating compensation transformation parameters through a matrix calculated by applying singular value decomposition to a cross covariance matrix between the reference surface model and the floating surface model; and transforming the floating surface model according to the compensation transformation parameters, and executing registration of the reference surface model and the floating surface model.

10 Claims, 4 Drawing Sheets

(56) References Cited

U.S. PATENT DOCUMENTS

| | | | | |
|---|---|---|---|---|
| 8,131,038 | B2* | 3/2012 | Saddi | G06K 9/6209 |
| | | | | 382/128 |
| 8,160,316 | B2* | 4/2012 | Ohyu | G06K 9/3216 |
| | | | | 382/128 |
| 8,923,615 | B2* | 12/2014 | Schummers | G06T 7/0089 |
| | | | | 382/173 |
| 2003/0012423 | A1* | 1/2003 | Boland | G06F 19/3437 |
| | | | | 382/154 |
| 2008/0212852 | A1* | 9/2008 | Sun | G06T 7/0034 |
| | | | | 382/128 |
| 2009/0074238 | A1* | 3/2009 | Pfister | G06T 7/0046 |
| | | | | 382/100 |
| 2009/0123046 | A1* | 5/2009 | Mielekamp | A61B 6/4441 |
| | | | | 382/130 |
| 2009/0297061 | A1* | 12/2009 | Mareachen | G06T 11/00 |
| | | | | 382/285 |
| 2012/0194517 | A1* | 8/2012 | Izadi | G06T 17/00 |
| | | | | 345/420 |
| 2012/0236135 | A1 | 9/2012 | Daniel et al. | |
| 2015/0024337 | A1* | 1/2015 | Blassnig | G06T 7/0071 |
| | | | | 433/29 |

OTHER PUBLICATIONS

"Zippered Polygon Meshes from Range Images," Greg Turk et al, Proc. of SIGGRAPH, pp. 311-318, ACM, 1994.*

"A System for Human Jaw Modeling Using Intra-Oral Images," Sameh M. Yamany et al, Proceedings of the 20th Annual International Conference of the IEEE Engineering in Medicine and Biology Society, vol. 20, No. 2, 1998, pp. 563-566.*

"A Volumetric Method for Building Complex Models from Range Images," Brian Curless et al, Proc. of SIGGRAPH, pp. 303-312, ACM, 1996.*

Andrew E. Johnson et al., "Using Spin Images for Efficient Object Recognition in Cluttered 3D Scenes", IEEE Transactions on Pattern Analysis and Machine Intelligence, May 1999, pp. 433-449, vol. 21, No. 5.

* cited by examiner

APPARATUS AND METHOD FOR REGISTRATION OF SURFACE MODELS

CROSS-REFERENCE TO RELATED APPLICATIONS

This application claims the benefit of Korean Patent Application No. 10-2013-0165865, filed with the Korean Intellectual Property Office on Dec. 27, 2013, the disclosure of which is incorporated herein by reference in its entirety.

BACKGROUND

1. Technical Field

The present invention relates to a registration technology of surface models, more specifically to a technology for registration of a plurality of partial surface models obtained through an intra-oral scanner.

2. Background Art

Three-dimensional models need to be made as precisely as possible for orthodontic procedures or implant procedures in dentistry. The 3D surface model of a dental object is often generated by making a plastic model or by obtaining a radiograph. However, making a model takes a long time and requires a skilled technique of a dentist when the dental object is made. Accordingly, the radiograph is used instead of making the 3D surface model, but not only is the radiograph equipment expensive, but a high quality of photograph requires a large amount of radiation.

Introduced for assessing the 3D geometric structure of teeth is an intra-oral laser scanner, which is now recognized as an alternative to the radiograph. However, since the laser scanner has a small field of view (FOV), a single scanned surface model is not sufficient to encompass the entire teeth or dental object. Therefore, the single scanned surface model needs to be combined with another surface model that is obtained from another perspective, to generate the dental model. In this process of combining, it is imperative to find an area where the adjacent surface models overlap with each other and perform registration for this area.

In two common ways of registration, corresponding points are configured within the overlapped area of the two surface models, and then a transformation method is sought between the corresponding points, or a transformation method is sought to minimize the difference in distance between the two surface models. However, the transformation method is hardly found in both ways because it is not easy to find the overlapped area and a particular point of one surface model often corresponds with plural points of the other surface model.

SUMMARY

The present invention provides an apparatus and a method for registration of surface models that can obtain initial transformation parameters using a depth map image and perform registration of the surface models based on the initial transformation parameter.

An aspect of the present invention provides an apparatus for registration of surface models that includes: an input/output interface configured to have a reference surface model and a floating surface model inputted thereto; a memory having instructions for registration of the reference surface model and the floating surface model stored therein; and a processor configured for registration of the reference surface model and the floating surface model according to the instructions. The instructions perform: selecting initial transformation parameters corresponding to the floating surface model by comparing depth images of the reference surface model and the floating surface model; transforming the floating surface model according to the initial transformation parameters; calculating compensation transformation parameters through a matrix calculated by applying singular value decomposition to a cross covariance matrix between the reference surface model and the floating surface model; and transforming the floating surface model according to the compensation transformation parameters, and executing registration of the reference surface model and the floating surface model.

The selecting of initial transformation parameters corresponding to the floating surface model by comparing depth images of the reference surface model and the floating surface model can include: generating a depth map image of the reference surface model; repeating to apply out-of-plane transformation to the floating surface model and generate a depth map image of the floating surface model until similarities between the depth map image of the reference surface model and the depth map image of the floating surface model are in convergence; repeating to apply in-plane transformation to the depth map image of the floating surface model until similarities between the depth map image of the reference surface model and the depth map image of the floating surface model are in convergence; and selecting initial transformation parameters comprising parameters corresponding to the out-of-plane transformation and the in-plane transformation.

The out-of-plane transformation can be a transformation in which the floating surface model is rotated about X- and Y-axes and moved in a direction of Z-axis, and the in-plane transformation can be a transformation in which the floating surface model is moved in a direction of the X- and Y-axes and rotated about the Z-axis.

The step of calculating compensation transformation parameters through a matrix calculated by applying singular value decomposition to a cross covariance matrix between the reference surface model and the floating surface model and the step of transforming the floating surface model according to the compensation transformation parameters and executing registration of the reference surface model and the floating surface model can be repeated until surface distances between the reference surface model and the floating surface model are in convergence.

Each of the surface distances can be configured by matching points on an overlapped area of the reference surface model and the floating surface model with one another in such a way that distances between the matched points are minimized, and by calculating an average of the distances between the corresponded points.

Another aspect of the present invention provides a method for registration of surface models by an apparatus for registration of surface models that includes: comparing a depth image of a reference surface model with a depth image of a floating surface model and selecting initial transformation parameters corresponding to the floating surface model; transforming the floating surface model according to the initial transformation parameters; calculating compensation transformation parameters through a matrix calculated by applying singular value decomposition to a cross covariance matrix between the reference surface model and the floating surface model; and transforming the floating surface model according to the compensation transformation parameters, and executing registration of the reference surface model and the floating surface model.

The selecting of initial transformation parameters corresponding to the floating surface model by comparing depth images of the reference surface model and the floating surface model can include: generating a depth map image of the reference surface model; repeating to apply out-of-plane transformation to the floating surface model and generate a depth map image of the floating surface model until similarities between the depth map image of the reference surface model and the depth map image of the floating surface model are in convergence; repeating to apply in-plane transformation to the depth map image of the floating surface model until similarities between the depth map image of the reference surface model and the depth map image of the floating surface model are in convergence; and selecting initial transformation parameters comprising parameters corresponding to the out-of-plane transformation and the in-plane transformation.

The out-of-plane transformation can be a transformation in which the floating surface model is rotated about X- and Y-axes and moved in a direction of Z-axis, and the in-plane transformation can be a transformation in which the floating surface model is moved in a direction of the X- and Y-axes and rotated about the Z-axis.

The step of calculating compensation transformation parameters through a matrix calculated by applying singular value decomposition to a cross covariance matrix between the reference surface model and the floating surface model and the step of transforming the floating surface model according to the compensation transformation parameters and executing registration of the reference surface model and the floating surface model can be repeated until surface distances between the reference surface model and the floating surface model are in convergence.

Each of the surface distances can be configured by matching points on an overlapped area of the reference surface model and the floating surface model with one another in such a way that distances between the matched points are minimized, and by calculating an average of the distances between the corresponded points.

As such, according to an embodiment of the present invention, an overlapped area between two surface models can be readily found, thereby mitigating the calculation complexity required for the entire registration procedures.

Moreover, to an embodiment of the present invention can solve the problem of corresponding points being matched one to many, rather than one to one, between two surface models.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

When one element is described as "sending" or "transmitting" a signal to another element, it shall be construed as sending or transmitting the signal by having the one element connected to the other element directly but also by possibly having another element in between, unless otherwise described.

Figure 1:
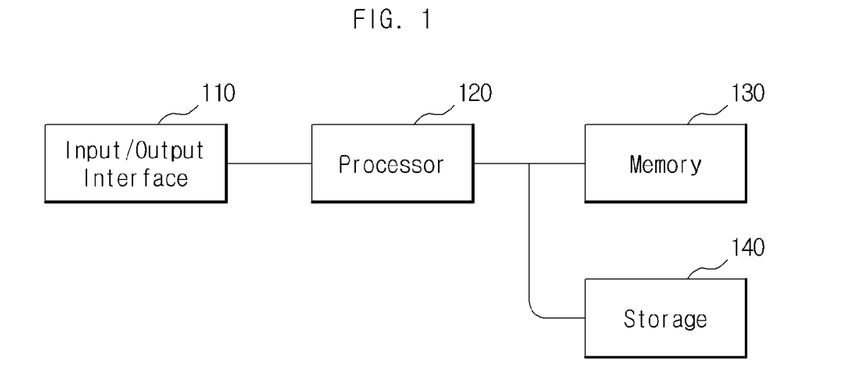
FIG. 1 is a block diagram showing the configuration of an apparatus for registration of surface models in accordance with an embodiment of the present invention.

FIG. 1 is a block diagram showing the configuration of an apparatus for registration of surface models in accordance with an embodiment of the present invention.

Referring to FIG. 1, the apparatus for registration of surface models includes an input/output interface 110, a processor 120, a memory 130 and a storage 140.

The input/output interface 110 has a plurality of surface models inputted thereto from an external device, such as an oral scanner, a terminal, etc. Here, the input/output interface 110 can have a conventionally known communication module to have the plurality of surface models inputted thereto from the external device.

The processor 120 performs registration of the plurality of surface models according to instructions loaded in the memory 130.

The memory 130 loads instructions stored in the storage 140 according to a control of the processor 120. The memory 130 can be a volatile storage medium.

The storage 140 can store therein instructions for instructing the steps for performing registration of the plurality of surface models and can be a non-volatile storage medium such as a hard disk, a flash memory, etc.

Described hereinafter will be how the processor performs registration of surface models according to the instructions.

Figure 2:
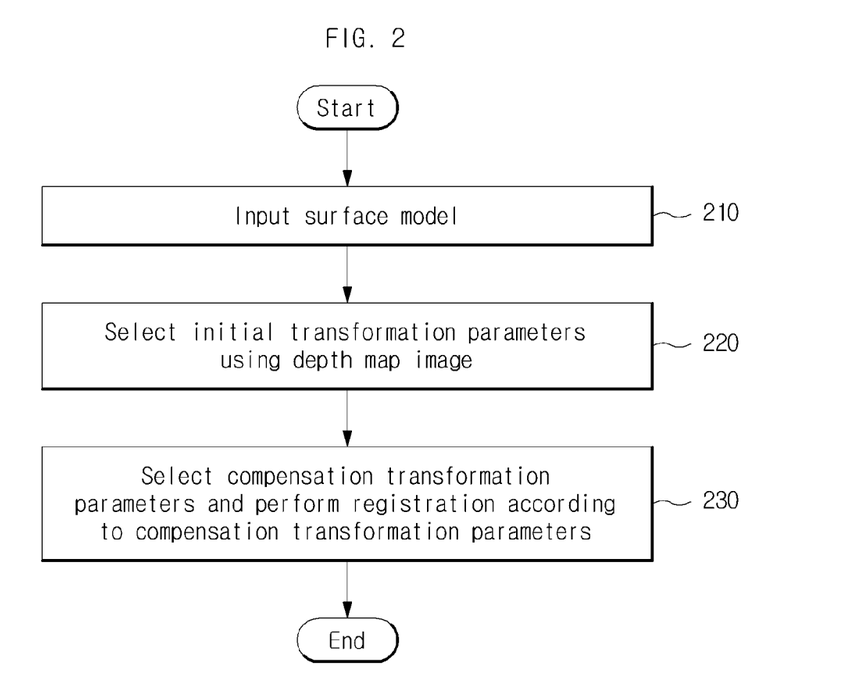
FIG. 2 is a flow diagram showing how the apparatus for registration of surface models in accordance with an embodiment of the present invention performs registration of the surface models.

FIG. 2 is a flow diagram showing how the apparatus for registration of surface models in accordance with an embodiment of the present invention performs registration of the surface models.

Referring to FIG. 2, in step 210, the apparatus for registration of surface models has a plurality of surface models inputted thereto. Here, each of the surface models can be a surface model generated by photographing an inside of an oral cavity of a human through an oral scanner.

In step 220, the apparatus for registration of surface models selects initial transformation parameters using a depth map image. Here, the apparatus for registration of surface models can generate the depth map image having a depth value that is calculated by projecting each surface model along a predefined Z-axis. The apparatus for registration of surface models can calculate the depth value by projecting vertices of a polygon, which signifies each surface model, along the Z-axis. Moreover, the apparatus for registration of surface models can calculate the inner point, a count of which is predetermined for each polygon, and can calculate an additional depth value by projecting the inner point.

For example, the apparatus for registration of surface models can calculate the inner point P according to the vertices, for example, $v_1$, $v_2$ and $v_3$, by use of barycentric interpolation as shown in [Mathematical Equation 1] below.

$$p = \alpha v_1 + \beta v_2 + \gamma v_3, \alpha + \beta + \gamma = 1, \alpha, \beta, \gamma \geq 0 \quad \text{[Mathematical Equation 1]}$$

The vertices and inner point to be projected by the apparatus for registration of surface models can be expressed as [Mathematical Equation 2] below. Hereinafter, the vertices and inner point will be collectively referred to as a sampling point.

[Mathematical Equation 2]

$$SP = \bigcup_{i=1}^{n} \{p^{i,1}, p^{i,2}, \ldots, p^{i,j}, \ldots, p^{i,m(i)}\}$$

Here, SP refers to a set of sampling points having an n number of triangles, and m(i) refers to an ith triangle, and $p^{i,j}$ is a jth point in the ith triangle obtained through [Mathematical Equation 1]. Before projecting each sampling point, the apparatus for registration of surface models configures a bounding box of a surface model and calculates a width w, a height h, and a center coordinate c. The apparatus for registration of surface models can calculate a 2-dimensional depth map image (DM(x,y)) of m×n, as shown in [Mathematical Equation 3] below, by projecting each sampling point included in SP.

[Mathematical Equation 3]

$$DM(x, y) = \underset{(x,y) \in S}{\mathrm{argmin}} p_z^{i,j},$$

$$S = \left\{ (x, y) \mid x = \left( \frac{p_x^{i,j} - c_x}{w} + 0.5 \right) \times m \text{ and } y = \left( \frac{p_y^{i,j} - c_y}{h} + -0.5 \right) \times n \right\}$$

Here, $c_x$ and $c_y$ are x and y coordinates of c, respectively, and $p_x^{i,j}, p_y^{i,j}, p_z^{i,j}$ are x, y, z coordinates of $p^{i,j}$, respectively. In other words, the depth map image can be calculated by projecting all point in SP.

Therefore, the apparatus for registration of surface models in accordance with an embodiment of the present invention can prevent the depth map image from losing the precision due to holes generated by large distances between the vertices.

The apparatus for registration of surface models selects the initial transformation parameters using the depth map image generated through the above procedures. The initial transformation parameters can be constituted with 3 parameters for indicating how much the surface model is rotated about X-, Y-, and Z-axes and 3 parameters for indicating how much the surface models is moved along the X-, Y-, and Z-axes. The procedures for selecting the initial transformation parameters will be described in detail with reference to FIG. 3.

In step 230, the apparatus for registration of surface models perform registration of the surface models using the initial transformation parameters. Here, since data loss occurs when transformation is made to the depth map image in the surface model, the precision of registration would be reduced if the initial transformation parameters were directly applied in the registration procedure. Accordingly, the apparatus for registration of surface models in accordance with an embodiment of the present invention calculates compensation transformation parameters for minimizing a surface distance between the surface models converted according to the initial transformation parameters, and performs registration according to the compensation transformation parameters. The procedures for calculating the compensation transformation parameters and performing registration will be described in detail with reference to FIG. 4.

Figure 3:
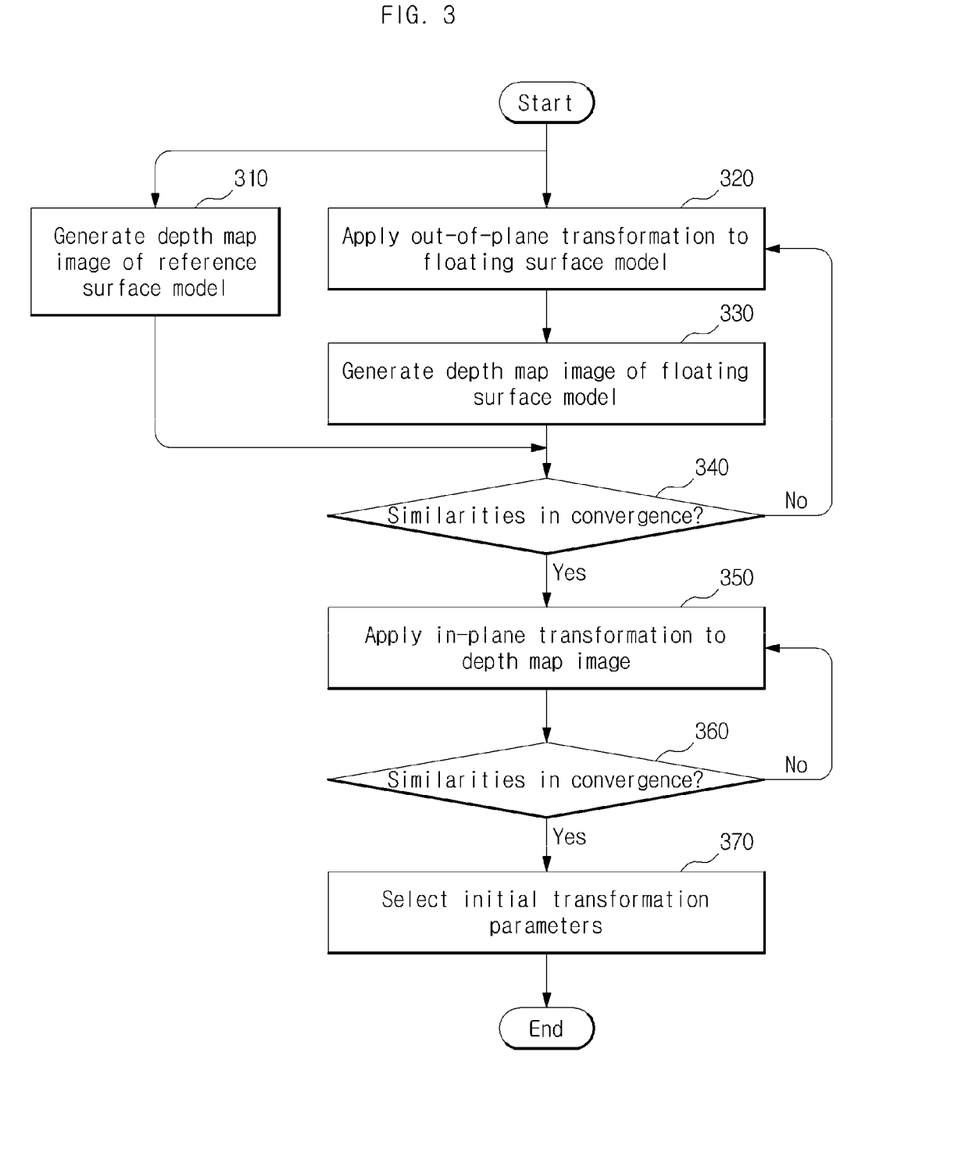
FIG. 3 is a flow diagram showing how the apparatus for registration of surface models in accordance with an embodiment of the present invention selects initial transformation parameters.

FIG. 3 is a flow diagram showing how the apparatus for registration of surface models in accordance with an embodiment of the present invention selects the initial transformation parameters. In other words, FIG. 3 can be a flow diagram for step 220 of FIG. 2.

Referring to FIG. 3, in step 310, the apparatus for registration of surface models generate a depth map image of a reference surface model. Here, the reference surface model is one of the plurality of surface models that is to be registered without transformation, and a floating surface model, which will be described later, is a surface model to be registered with the reference surface model through a transformation procedure. The procedure for generating the depth map image for the surface model has been described above with reference to FIG. 2.

In step 320, the apparatus for registration of surface models applies out-of-plane transformation to the floating surface model. Here, the out-of-plane transformation can involve rotating the surface model about predetermined X- and Y-axes and moving the surface model in the direction of Z-axis. Here, parameters used for the out-of-plane transformation can be randomly selected among parameters that are not used in a previous out-of-plane transformation or can be selected according to a predetermined pattern.

In step 330, the apparatus for registration of surface models generates the depth map image of the floating surface model out-of-plane transformed in step 320.

In step 340, the apparatus for registration of surface models determines whether similarities are in convergence between the depth map image of the reference surface model and the depth map image of the floating surface model. That is, the apparatus for registration of surface models can determine whether the similarities between the depth map image of the reference surface model and the depth map image of the floating surface model that is out-of-plane transformed according to various parameters satisfy a predetermined convergence condition. Here, the convergence condition can be a condition determining that it is in convergence if the difference between a similarity calculated in a previous step and a similarity calculated presently is smaller than or equal to a predetermined numerical value. Here, the similarity can be a regular cross-correlation index, as shown in [Mathematical Equation 4] below.

[Mathematical Equation 4]

$$NCC(DM_R, DM_F; T) = \frac{\sum_{\Omega} (DM_R(x) - \overline{DM_R})(DM_{TF}(x) - \overline{DM_{TF}})}{\sqrt{\sum_{\Omega} (DM_R(x) - \overline{DM_R})^2 \sum_{\Omega} (DM_{TF}(x) - \overline{DM_{TF}})^2}}$$

Here, $\overline{DM_R}$ is an average of $DM_R$, and $\overline{DM_{TF}}$ is an average of $DM_{TF}$. $DM_R$ is the depth map image of a reference surface model. $DM_F$ is the depth map image of a floating surface model. $DM_{TF}$ is the depth map image of a transformed floating surface model. The symbol x represents a point of a depth map image.

In step 340, if the similarities of the depth map images between the reference surface model and the floating surface model are not in convergence, the apparatus for registration of surface models can repeat the procedures from step 320.

In step 340, if the similarities between the depth map images of the reference surface model and the floating surface model are in convergence, the apparatus for registration of surface models applies in-plane transformation, in step 350, to the similarity-converged depth map image of out-of-plane transformed floating surface model. Here, the in-plane transformation is a 2-dimensional transformation in which the 2-dimensional, depth map image is moved with respect to X- and Y-axes and rotated about Z-axis.

In step 350, the apparatus for registration of surface models determines whether similarities are in convergence between the depth map image of the in-plane transformed floating surface model and the depth map image of the reference surface model.

In step 360, if the similarities are not in convergence between the depth map image of the in-plane transformed floating surface model and the depth map image of the reference surface model, the apparatus for registration of surface models repeats the procedures from step 350.

In step 360, if the similarities are in convergence between the depth map image of the in-plane transformed floating surface model and the depth map image of the reference surface model, the apparatus for registration of surface models selects, in step 370, initial transform parameters that include parameters used for out-of-plane transformation and in-plane transformation through which the similarities are in convergence.

Figure 4:
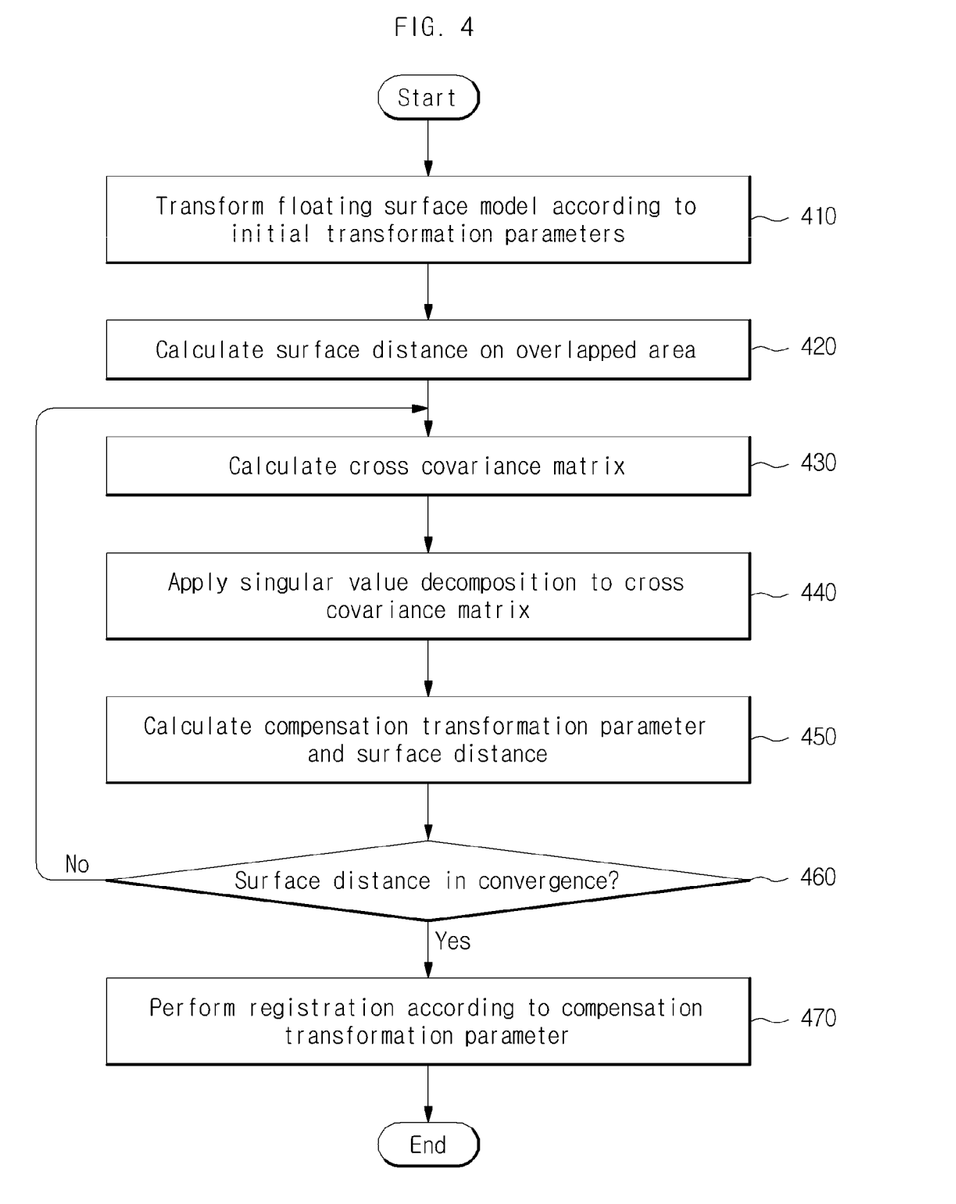
FIG. 4 is a flow diagram showing how the apparatus for registration of surface models in accordance with an embodiment of the present invention performs registration of the surface models using the initial transformation parameters.

FIG. 4 is a flow diagram showing how the apparatus for registration of surface models in accordance with an embodiment of the present invention performs registration of the surface models using the initial transform parameters. In other words, FIG. 4 is a flow diagram illustrating step 230 of FIG. 2.

Referring to FIG. 4, in step 410, the apparatus for registration of surface models transforms the floating surface model according to the initial transformation parameters.

In step 420, the apparatus for registration of surface models calculates a surface distance between the reference surface model and the floating surface model on an overlapped area. For example, the apparatus for registration of surface models calculates the surface distance between the reference surface model and the floating surface model as shown in [Mathematical Equation 5] below.

[Mathematical Equation 5]
$$ASD = \frac{1}{n^{OFS_T}} \sum_{i=1}^{n^{OFS_T}} d(p_i^{OFS_T}, ORS),$$

ORS refers to an overlapped area in the reference surface model, and $OFS_T$ refers to an overlapped area in the transformed floating surface model. $n^{OFS_T}$ refers to the number of points in $OFS_T$, and $p_i^{OFS_T}$ refers to an ith point in $OFS_T$. $d(p_i^{OFS_T}, ORS)$ refers to a minimum distance between $p_i^{OFS_T}$ and ORS, as shown in [Mathematical Equation 6].

[Mathematical Equation 6]
$$d(p_i^{OFS_T}, ORS) = \min_{j \in 1, \ldots, n^{ORS}} d(p_i^{OFS_T}, p_j^{ORS})$$

$n^{ORS}$ refers to the number of points in ORS, and $p_j^{ORS}$ refers to a jth point in ORS. $P^{ORS} = \{p_i^{ORS}\}$ is a set of points in ORS, and $P^{OFS_T} = \{p_i^{OFS_T}\}$ is a set of points in $OFS_T$. Here, each of the points $p_i^{ORS}$ having a same index corresponds to $p_i^{OFS_T}$.

In step 430, the apparatus for registration of surface model calculates a cross covariance matrix between points of the reference surface model and points of the floating surface model on the overlapped area. For example, in the case where an objective function according to transformation parameters is defined as shown in [Mathematical Equation 7] below, the apparatus for registration of surface models can calculate the cross covariance matrix (B) shown in [Mathematical Equation 8] below.

[Mathematical Equation 7]
$$f(R, t) = \frac{1}{N} \sum_{i=1}^{N} \left\| p_i^{ORS} - R \circ p_i^{OFS_T} - t \right\|$$

Here, R is a matrix indicating parameters for rotation transformation among the transformation parameters (initial transformation parameters or compensation transformation parameters), and t is a vector indicating parameters for movement transformation among the transformation parameters.

[Mathematical Equation 8]
$$H = \sum_{i}^{N} (p_i^{ORS} - \bar{p}^{ORS})(p_i^{OFS_T} - \bar{p}^{OFS_T})^T$$

Here, $\bar{p}^{ORS}$ is a center of gravity of $P^{ORS}$, and $\bar{p}^{OFS_T}$ is a center of gravity of $p^{OFS_T}$.

In step 440, the apparatus for registration of surface models applies singular value decomposition (SVD) to the cross covariance matrix. For example, the apparatus for registration of surface models applies SVD as shown in [Mathematical Equation 9] below.

$$H = U\Lambda V^T \quad \text{[Mathematical Equation 9]}$$

In step 450, the apparatus for registration of surface models calculates compensation transformation parameters and surface distance using the matrix computed through SVD. For example, the apparatus for registration of surface models can calculate $VU^T$, which is a new rotational transformation matrix, using V and U, which are matrices decomposed in step 440, and can calculate a new movement transformation vector. The apparatus for registration of surface models calculates the compensation transformation parameters, which transformation parameters pursuant to the new rotational transformation matrix and movement transformation vector, and transforms the floating surface model and calculates the surface distance pursuant to the compensation transformation parameters.

In step 469, the apparatus for registration of surface models determines whether the surface distance satisfies a predetermined convergence condition. Here, the convergence condition can be a condition determining that it is in convergence if the difference between a surface distance calculated in a previous step and a surface distance calculated presently is smaller than or equal to a predetermined numerical value.

In step 460, if the surface distances are not in convergence, the apparatus for registration of surface models can repeat the procedures from step 430.

In step 460, if the surface distances are in convergence, the apparatus for registration of surface models transforms the floating surface model according to the compensation transformation parameters, performs registration of the floating surface model with the reference surface model, and outputs the registered model through the input/output interface 110.

Figure 5:
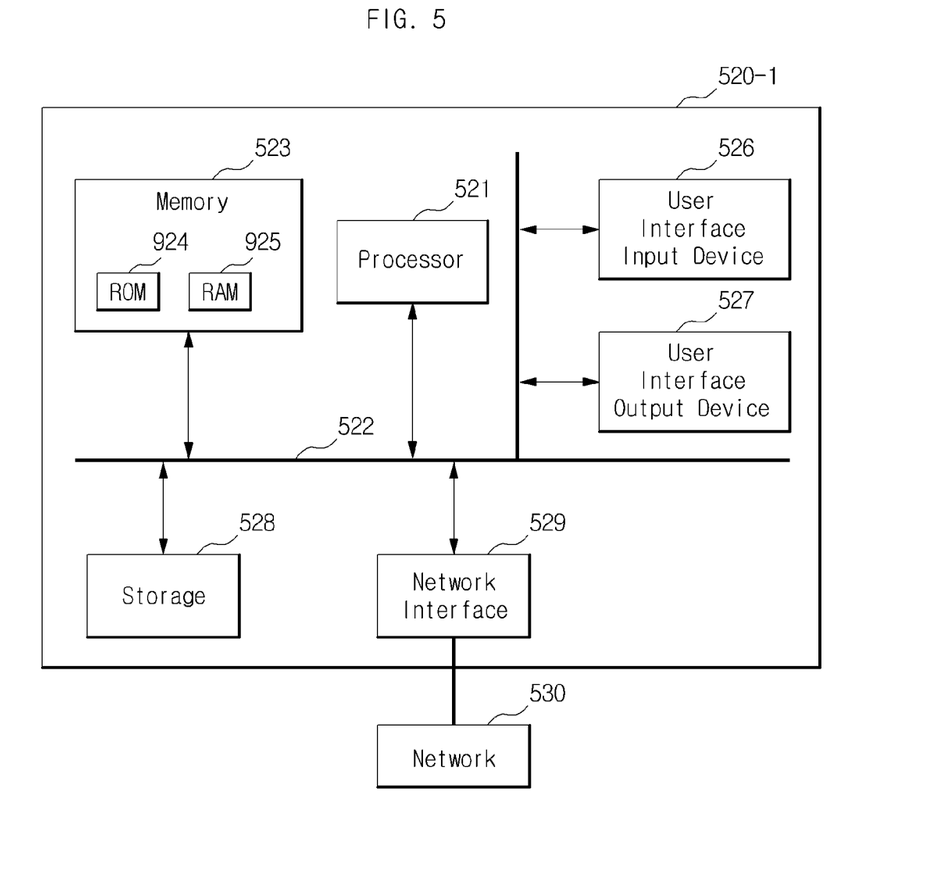
FIG. 5 is a block diagram showing the configuration of an apparatus for registration of surface models in accordance with another embodiment of the present invention.

FIG. 5 is a block diagram showing the configuration of an apparatus for registration of surface models in accordance with another embodiment of the present invention.

Another embodiment of the present invention may be implemented in a computer system, e.g., as a computer readable medium. As shown in FIG. 5, a computer system 520-1 may include one or more of a processor 521, a memory 523, a user input device 526, a user output device 527, and a storage 528, each of which communicates through a bus 522. The computer system 520-1 may also include a network interface 529 that is coupled to a network 530. The processor 521 may be a central processing unit (CPU) or a semiconductor device that executes processing instructions stored in the memory 523 and/or the storage 528. The memory 523 and the storage 528 may include various forms of volatile or non-volatile storage media. For example, the memory may include a read-only memory (ROM) 524 and a random access memory (RAM) 525.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

Hitherto, certain embodiments of the present invention have been described, and it shall be appreciated that a large number of permutations and modifications of the present invention are possible without departing from the intrinsic features of the present invention by those who are ordinarily skilled in the art to which the present invention pertains. Accordingly, the disclosed embodiments of the present invention shall be appreciated in illustrative perspectives, rather than in restrictive perspectives, and the scope of the technical ideas of the present invention shall not be restricted by the disclosed embodiments. The scope of protection of the present invention shall be interpreted through the claims appended below, and any and all equivalent technical ideas shall be interpreted to be included in the claims of the present invention.

What is claimed is:

1. An apparatus for registration of surface models, comprising:
    an input/output interface configured to have a reference surface model and a floating surface model inputted thereto;
    a memory having instructions for registration of the reference surface model and the floating surface model stored therein; and
    a processor configured for registration of the reference surface model and the floating surface model according to the instructions,
    wherein the instructions perform:
    selecting initial transformation parameters corresponding to the floating surface model by comparing depth images of the reference surface model and the floating surface model;
    transforming the floating surface model according to the initial transformation parameters;
    calculating compensation transformation parameters through a matrix calculated by applying singular value decomposition to a cross covariance matrix between the reference surface model and the floating surface model; and
    transforming the floating surface model according to the compensation transformation parameters, and executing registration of the reference surface model and the floating surface model.

2. The apparatus of claim 1, wherein the selecting of initial transformation parameters corresponding to the floating surface model by comparing depth images of the reference surface model and the floating surface model comprises:
    generating a depth map image of the reference surface model;
    repeating to apply out-of-plane transformation to the floating surface model and generate a depth map image of the floating surface model until similarities between the depth map image of the reference surface model and the depth map image of the floating surface model are in convergence;
    repeating to apply in-plane transformation to the depth map image of the floating surface model until similarities between the depth map image of the reference surface model and the depth map image of the floating surface model are in convergence; and
    selecting initial transformation parameters comprising parameters corresponding to the out-of-plane transformation and the in-plane transformation.

3. The apparatus of claim 2, wherein the out-of-plane transformation is a transformation in which the floating surface model is rotated about X- and Y-axes and moved in a direction of Z-axis, and wherein the in-plane transformation is a transformation in which the floating surface model is moved in a direction of the X- and Y-axes and rotated about the Z-axis.

4. The apparatus of claim 1, wherein the step of calculating compensation transformation parameters through a matrix calculated by applying singular value decomposition to a cross covariance matrix between the reference surface model and the floating surface model and the step of transforming the floating surface model according to the compensation transformation parameters and executing registration of the reference surface model and the floating surface model are repeated until surface distances between the reference surface model and the floating surface model are in convergence.

5. The apparatus of claim 4, wherein each of the surface distances is configured by matching points on an overlapped area of the reference surface model and the floating surface model with one another in such a way that distances between the matched points are minimized, and calculating an average of the distances between the corresponded points.

6. A method for registration of surface models by an apparatus for registration of surface models, the method comprising:
    comparing a depth image of a reference surface model with a depth image of a floating surface model and selecting initial transformation parameters corresponding to the floating surface model;
    transforming the floating surface model according to the initial transformation parameters;
    calculating compensation transformation parameters through a matrix calculated by applying singular value decomposition to a cross covariance matrix between the reference surface model and the floating surface model; and
    transforming the floating surface model according to the compensation transformation parameters, and executing registration of the reference surface model and the floating surface model.

7. The method of claim 6, wherein the selecting of initial transformation parameters corresponding to the floating surface model by comparing depth images of the reference surface model and the floating surface model comprises:
    generating a depth map image of the reference surface model;
    repeating to apply out-of-plane transformation to the floating surface model and generate a depth map image of the floating surface model until similarities between the depth map image of the reference surface model and the depth map image of the floating surface model are in convergence;

repeating to apply in-plane transformation to the depth map image of the floating surface model until similarities between the depth map image of the reference surface model and the depth map image of the floating surface model are in convergence; and selecting initial transformation parameters comprising parameters corresponding to the out-of-plane transformation and the in-plane transformation.

8. The method of claim 7, wherein the out-of-plane transformation is a transformation in which the floating surface model is rotated about X- and Y-axes and moved in a direction of Z-axis, and wherein the in-plane transformation is a transformation in which the floating surface model is moved in a direction of the X- and Y-axes and rotated about the Z-axis.

9. The method of claim 6, wherein the step of calculating compensation transformation parameters through a matrix calculated by applying singular value decomposition to a cross covariance matrix between the reference surface model and the floating surface model and the step of transforming the floating surface model according to the compensation transformation parameters and executing registration of the reference surface model and the floating surface model are repeated until surface distances between the reference surface model and the floating surface model are in convergence.

10. The method of claim 9, wherein each of the surface distances is configured by matching points on an overlapped area of the reference surface model and the floating surface model with one another in such a way that distances between the matched points are minimized, and calculating an average of the distances between the corresponded points.

\* \* \* \* \*